(12) United States Patent
Nakamura

(10) Patent No.: US 8,593,736 B2
(45) Date of Patent: Nov. 26, 2013

(54) ZOOM LENS AND IMAGE PICKUP APPARATUS INCLUDING THE SAME

(75) Inventor: Tomoyuki Nakamura, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 49 days.

(21) Appl. No.: 13/438,888

(22) Filed: Apr. 4, 2012

(65) Prior Publication Data

US 2012/0262801 A1 Oct. 18, 2012

(30) Foreign Application Priority Data

Apr. 14, 2011 (JP) ................................. 2011-089686

(51) Int. Cl.
*G02B 15/14* (2006.01)

(52) U.S. Cl.
USPC ........................................................ 359/687

(58) Field of Classification Search
USPC ........................................................ 359/687
See application file for complete search history.

(56) References Cited

U.S. PATENT DOCUMENTS

| 2004/0169934 A1 | 9/2004 | Oomura et al. |
| 2005/0219709 A1* | 10/2005 | Wakazono .................... 359/686 |
| 2008/0037136 A1 | 2/2008 | Tsutsumi et al. |

FOREIGN PATENT DOCUMENTS

| JP | 2004-264458 A | 9/2004 |
| JP | 2008-040395 A | 2/2008 |

\* cited by examiner

*Primary Examiner* — William Choi
(74) *Attorney, Agent, or Firm* — Rossi, Kimms & McDowell LLP

(57) ABSTRACT

A zoom lens includes, in order from an object side: a first lens unit having a positive refractive power which does not move for varying magnification; a second lens unit having a negative refractive power which moves for varying magnification; a third lens unit having a positive refractive power which moves for varying magnification; and a fourth lens unit having a positive refractive power which does not move for varying magnification, in which: the first lens unit includes a first sub lens unit which does not move for focusing and a second sub lens unit having a positive refractive power which moves for focusing; the first sub lens unit includes three lenses having negative, positive, and positive refractive powers; and each of the elements is appropriately set.

7 Claims, 7 Drawing Sheets

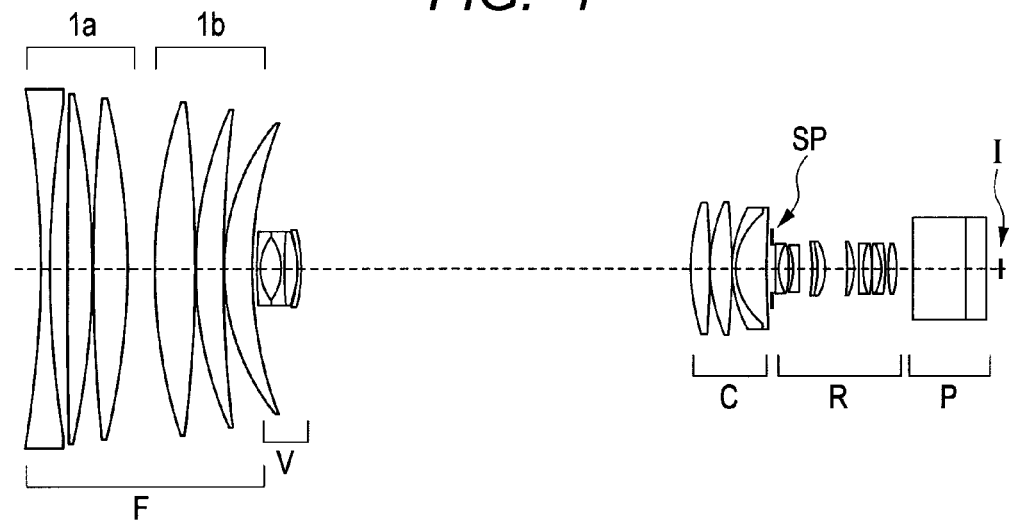
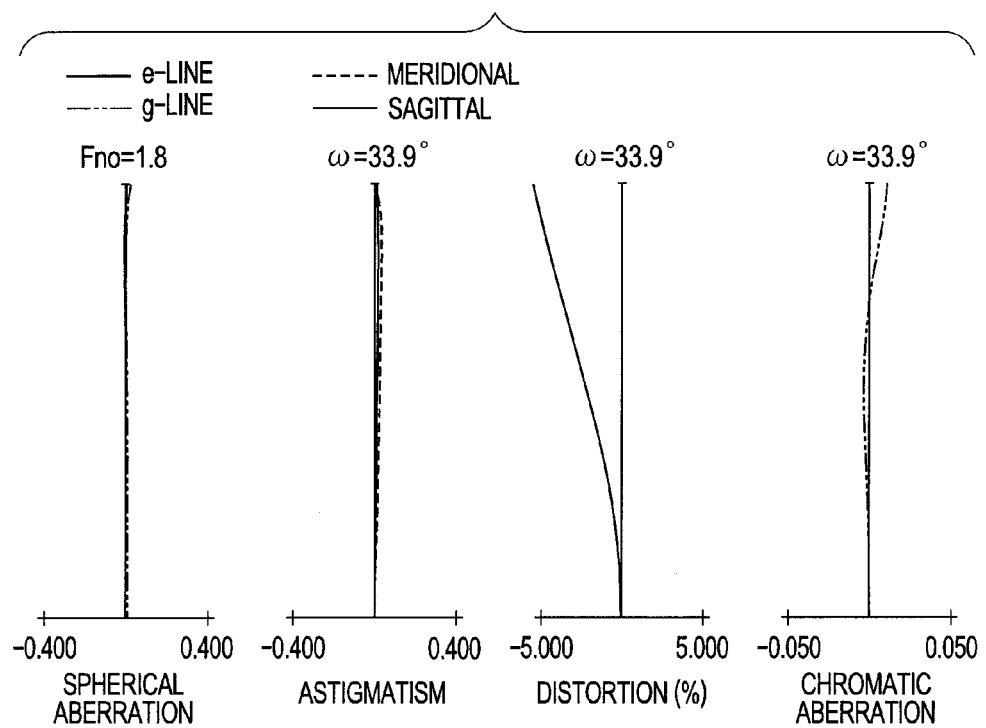

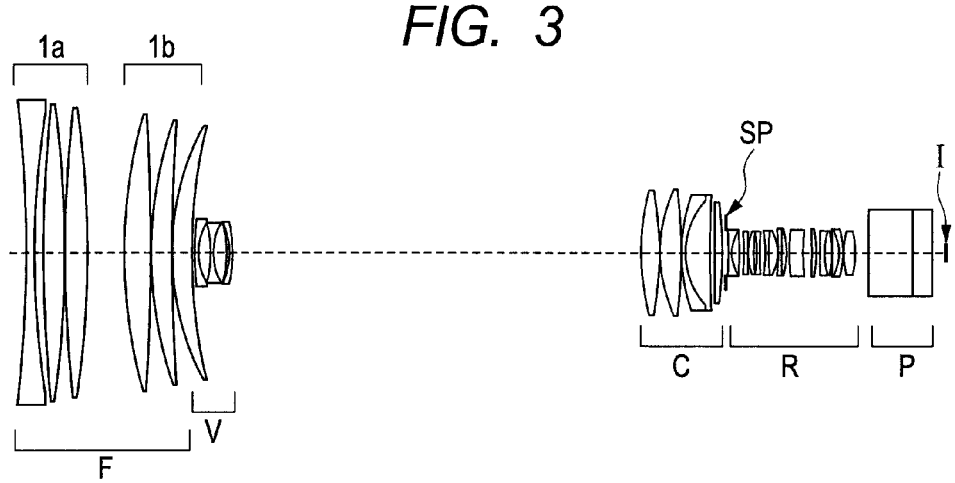
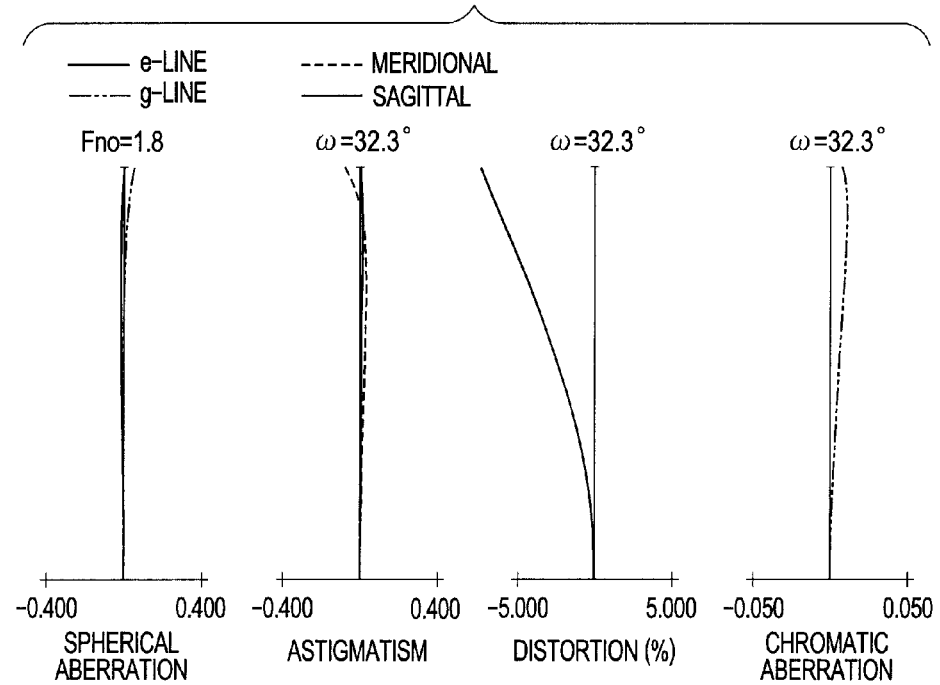

ZOOM LENS AND IMAGE PICKUP APPARATUS INCLUDING THE SAME

BACKGROUND OF THE INVENTION

1. Field of the Invention

The present invention relates to a zoom lens and an image pickup apparatus including the same, and more particularly, to a zoom lens suitable for use in a broadcasting TV camera, a video camera, a digital still camera, and a silver-halide film camera.

2. Description of the Related Art

In recent years, a zoom lens having a wide angle of field, a high magnification, and a high optical performance is desired for use in an image pickup apparatus such as a TV camera, a silver-halide film camera, a digital camera, or a video camera. As a high magnification zoom lens, there is known a four-unit zoom lens including a first lens unit having a positive refractive power, a second lens unit having a negative refractive power for varying magnification, a third lens unit having a positive refractive power for correcting image plane variation, and a fourth lens unit having a positive refractive power for image formation.

For instance, Japanese Patent Application Laid-Open No. 2004-264458 discloses a zoom lens having a wide-angle end field angle of 60.93 degrees and a zoom magnification of approximately 96. Japanese Patent Application Laid-Open No. 2008-40395 discloses a zoom lens having a wide-angle end field angle of 60.35 degrees and a zoom magnification of approximately 55.

The above-mentioned four-unit zoom lens is advantageous for achieving high magnification. On the other hand, in recent years, there is a demand for a wide angle also in a high-magnification zoom lens.

However, in order to achieve a high magnification, it is necessary to secure a large movable range of a magnification varying lens unit, and there is a tendency that a lens diameter of the first lens unit disposed closest to an object side becomes large. In addition, in order to achieve a wide angle, it is necessary to secure a large incident angle of light beam entering the lens, and there is also a tendency that the lens diameter of the first lens unit becomes large. In order to achieve both a wide angle and a high magnification and to suppress an increase of the lens diameter of the first lens unit, it is effective to arrange a position of a principal point of the first lens unit in an image side of the first lens unit. In this case, if the structure of the first lens unit is inappropriate, it becomes difficult to achieve both the arrangement of the principal point and correction of spherical aberration on a telephoto side or off-axial aberration on a wide angle side.

SUMMARY OF THE INVENTION

The present invention provides a zoom lens that can easily achieve a small size and light weight, a wide angle, and a high magnification, and is capable of correcting various aberrations appropriately by adjusting the first lens unit appropriately, and to provide an image pickup apparatus including the zoom lens.

According to an exemplary embodiment of the present invention, there is provided a zoom lens including, in order from an object side: a first lens unit having a positive refractive power which does not move for varying magnification; a second lens unit having a negative refractive power which moves for varying magnification; a third lens unit having a positive refractive power which moves for varying magnification; and a fourth lens unit having a positive refractive power which does not move for varying magnification, in which: the first lens unit includes a first sub lens unit which does not move for focusing and a second sub lens unit having a positive refractive power which moves for focusing; the first sub lens unit includes three lenses having negative, positive, and positive refractive powers; and the following conditions are satisfied:

$$0.5 < |(R12+R21)/(R12-R21)| < 40;$$

and $$2.5 < ft/f1 < 4.7,$$

where R12 denotes a curvature radius of an image-side surface of a negative lens of the first sub lens unit, R21 denotes a curvature radius of an object-side surface of an object-side positive lens of the first sub lens unit, f1 denotes a focal length of the first lens unit, and ft denotes a focal length of the zoom lens at a telephoto end thereof.

According to the present invention, it is possible to obtain a zoom lens that can easily achieve a small size and light weight, a wide angle, and a high magnification, and is capable of correcting various aberrations appropriately by adjusting the first lens unit appropriately.

Further features of the present invention will become apparent from the following description of exemplary embodiments with reference to the attached drawings.

BRIEF DESCRIPTION OF THE DRAWINGS

FIG. 1 is a lens cross-sectional view at a wide-angle end when focusing at infinity according to Numerical Embodiment 1 of the present invention.

FIG. 2A is an aberration graph at the wide-angle end when focusing at infinity according to of Numerical Embodiment 1 of the present invention.

FIG. 3 is a lens cross-sectional view at the wide-angle end when focusing at infinity according to Numerical Embodiment 2 of the present invention.

FIG. 4A is an aberration graph at the wide-angle end when focusing at infinity according to Numerical Embodiment 2 of the present invention.

DESCRIPTION OF THE EMBODIMENTS

Hereinafter, embodiments of the present invention are described in detail with reference to the attached drawings.

A zoom lens of the present invention includes, in order from an object side to an image side, a first lens unit having a positive refractive power which does not move for varying magnification, and a second lens unit having a negative refractive power which moves for varying magnification. Further, the zoom lens includes a third lens unit having a positive refractive power which moves for correcting image plane variation due to magnification-varying, and a fourth lens unit having a positive refractive power which does not move for varying magnification. Herein, the expression that "a lens unit does not move for varying magnification" means that the lens unit is not driven for a purpose of varying magnification, but the lens unit may move for focusing if magnification-varying and focusing are performed simultaneously.

Figure 2B:
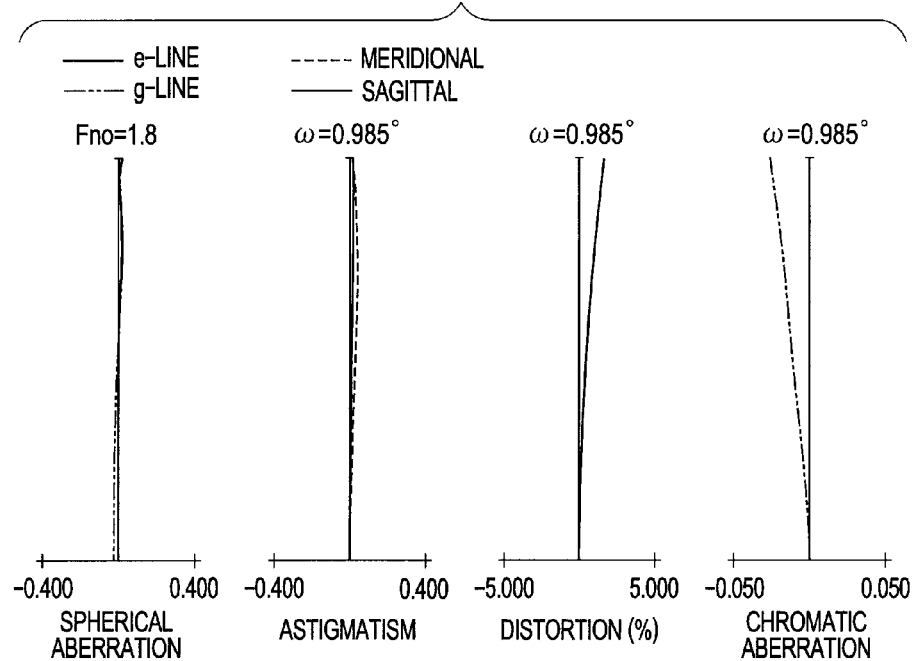
FIG. 2B is an aberration graph at an intermediate zoom position when focusing at infinity according to Numerical Embodiment 1 of the present invention.
Figure 2C:
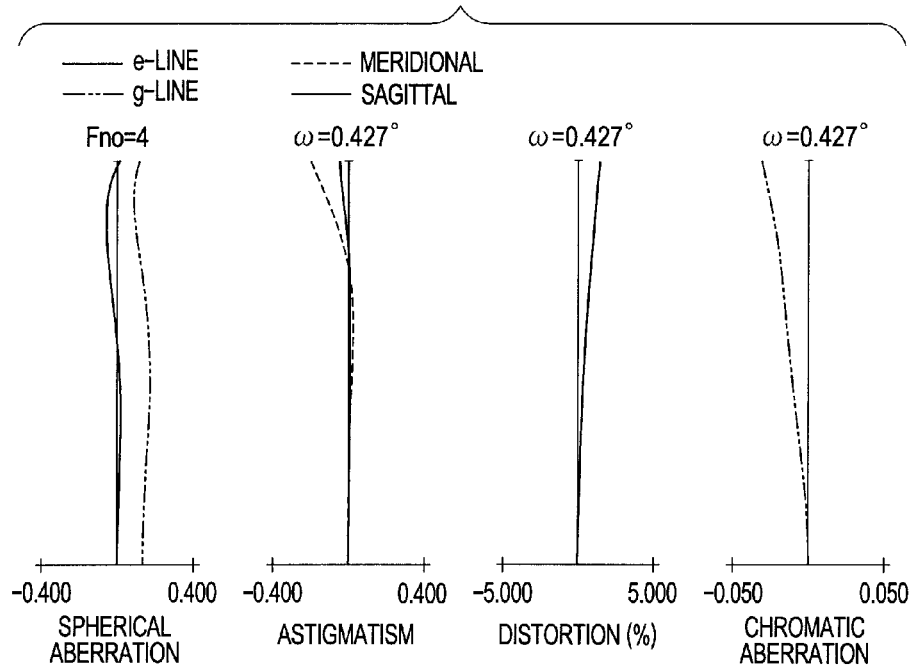
FIG. 2C is an aberration graph at a telephoto end when focusing at infinity according to Numerical Embodiment 1 of the present invention.

FIG. 1 is a lens cross-sectional view in a state in which an object at infinity is in focus at a wide-angle end (focal length f=8.2 mm) of a zoom lens according to Embodiment 1 (Numerical Embodiment 1) of the present invention. FIG. 2A is an aberration graph when an object at infinity is in focus at the wide-angle end, FIG. 2B is an aberration graph when an object at infinity is in focus at an intermediate zoom position (focal length f=320 mm), and FIG. 2C is an aberration graph when an object at infinity is in focus at a telephoto end (f=738 mm) according to Numerical Embodiment 1. Note that, the values of the focal length are expressed in millimeters in numerical embodiments. The same applies to all embodiments described below.

Figure 4B:
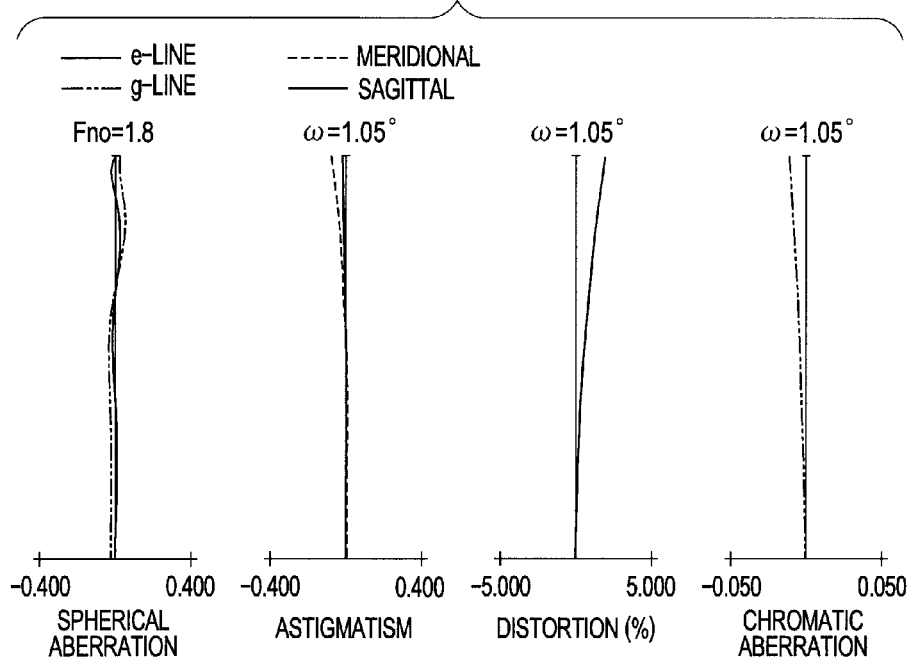
FIG. 4B is an aberration graph at an intermediate zoom position when focusing at infinity according to Numerical Embodiment 2 of the present invention.
Figure 4C:
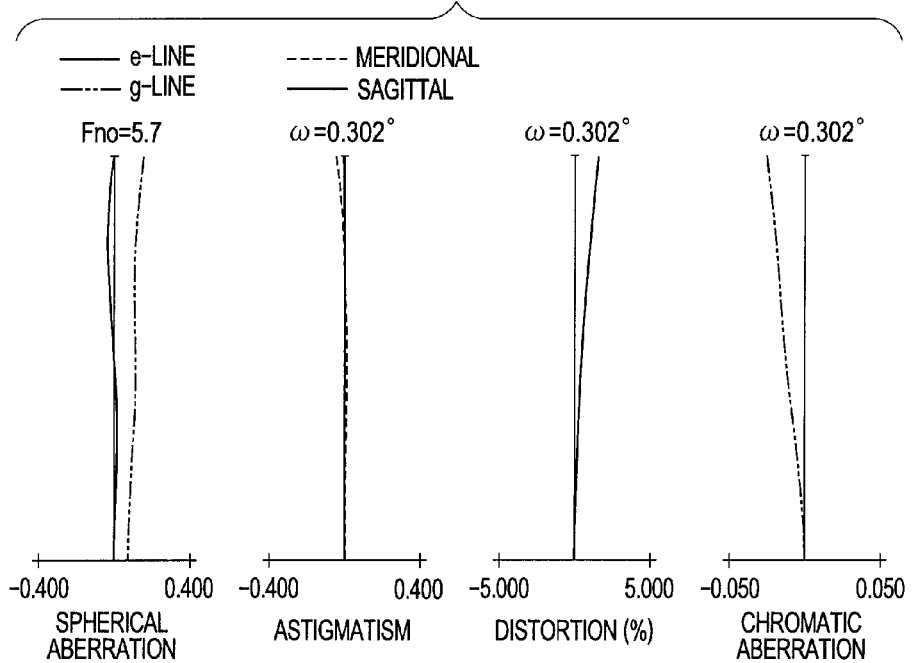
FIG. 4C is an aberration graph at the telephoto end when focusing at infinity according to Numerical Embodiment 2 of the present invention.

FIG. 3 is a lens cross-sectional view in the state in which an object at infinity is in focus at a wide-angle end (f=8.7 mm) of a zoom lens according to Embodiment (Numerical Embodiment 2) of the present invention. FIG. 4A is an aberration graph when an object at infinity is in focus at the wide-angle end, FIG. 4B is an aberration graph when an object at infinity is in focus at an intermediate zoom position (focal length f=300 mm), and FIG. 4C is an aberration graph when an object at infinity is in focus at a telephoto end (f=1044 mm) according to Numerical Embodiment 2.

Figure 5:
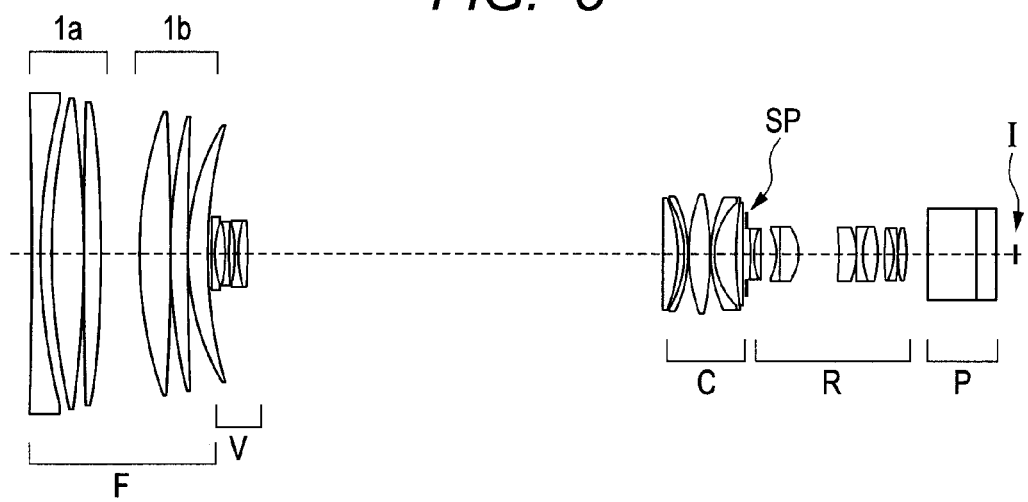
FIG. 5 is a lens cross-sectional view at the wide-angle end when focusing at infinity according to Numerical Embodiment 3 of the present invention.
Figure 6A:
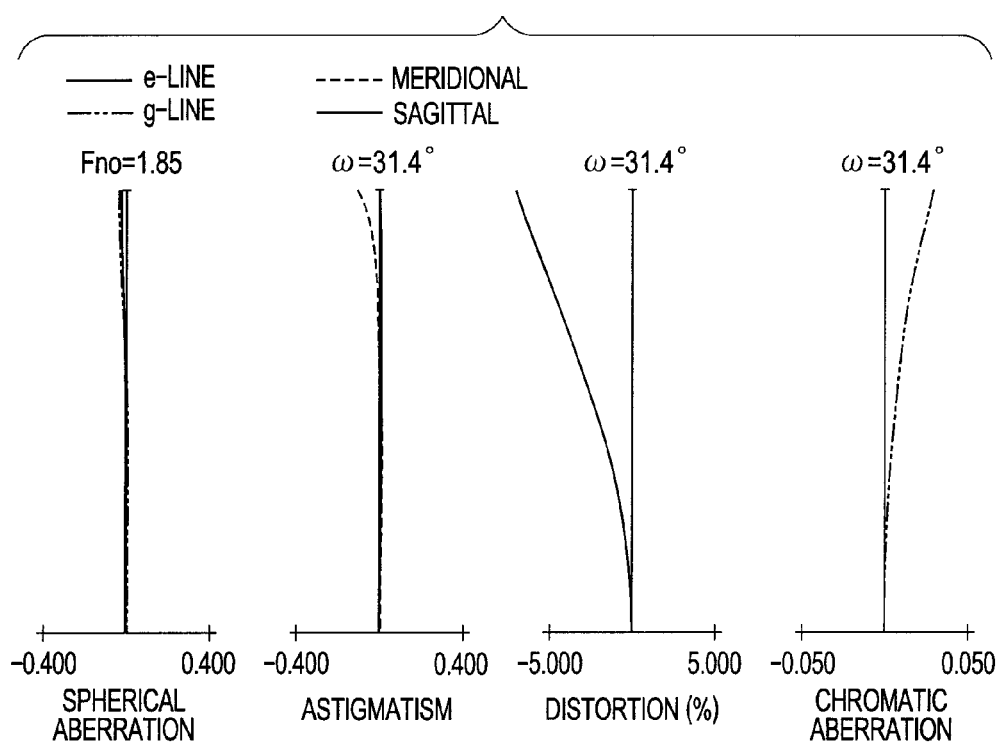
FIG. 6A is an aberration graph at the wide-angle end when focusing at infinity according to Numerical Embodiment 3 of the present invention.
Figure 6B:
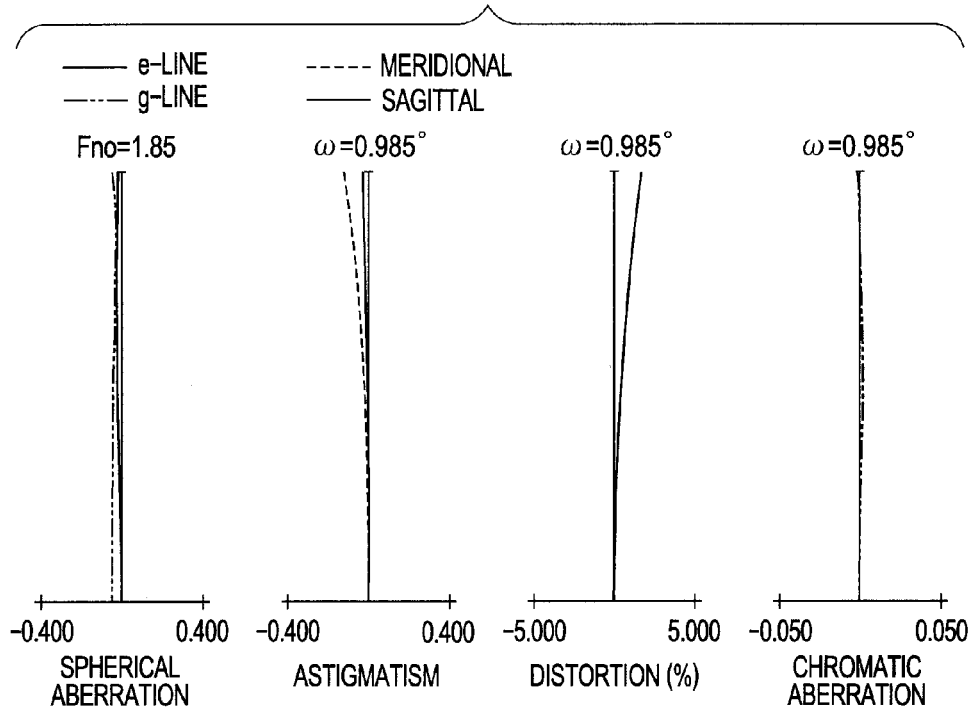
FIG. 6B is an aberration graph at the intermediate zoom position when focusing at infinity according to Numerical Embodiment 3 of the present invention.
Figure 6C:
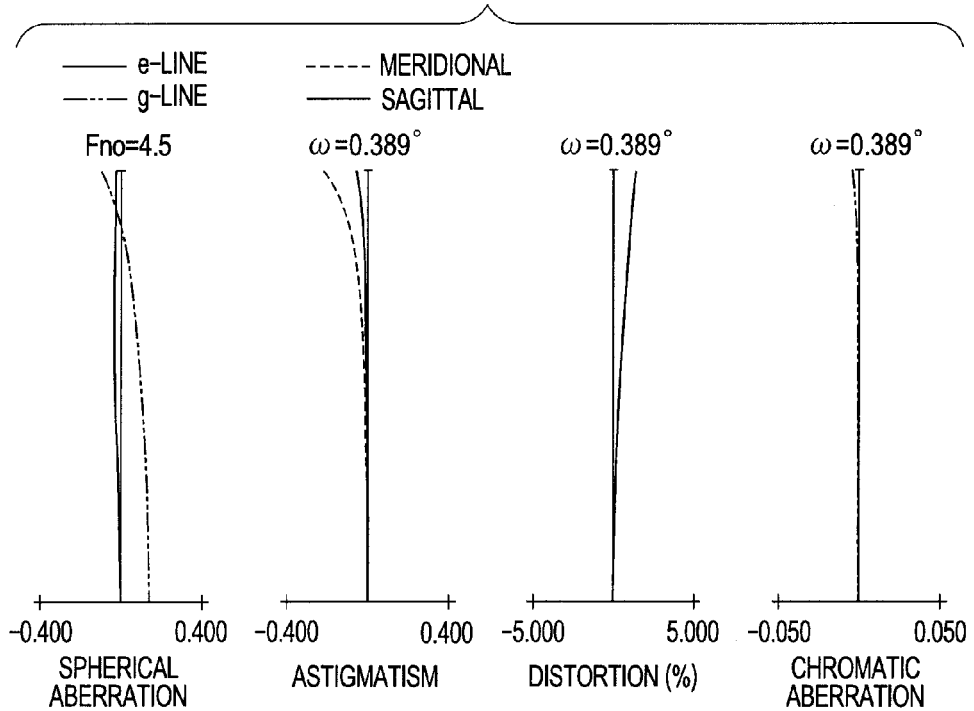
FIG. 6C is an aberration graph at the telephoto end when focusing at infinity according to Numerical Embodiment 3 of the present invention.

FIG. 5 is a lens cross-sectional view in the state in which an object at infinity is in focus at a wide-angle end (f=9.0 mm) of a zoom lens according to Embodiment (Numerical Embodiment 3) of the present invention. FIG. 6A is an aberration graph when an object at infinity is in focus at the wide-angle end, FIG. 6B is an aberration graph when an object at infinity is in focus at an intermediate zoom position (focal length f=320 mm), and FIG. 6C is an aberration graph when an object at infinity is in focus at a telephoto end (f=810 mm) according to Numerical Embodiment 3.

In each lens cross section, the left side is a subject (object) side (front), and the right side is the image side (rear). In the lens cross section, a front lens unit F has a positive refractive power as the first lens unit which does not move for varying magnification. A focus second sub lens unit 1b in the first lens unit F moves toward the object side when focusing from an object at infinity to an object at a close range. A fixed first sub lens unit 1a in the first lens unit F does not move for focusing. A variator V has a negative refractive power as the second lens unit for varying magnification and is moved on an optical axis monotonously toward an image plane side so as to vary magnification from the wide-angle end to the telephoto end. A compensator C has a positive refractive power as the third lens unit and moves on the optical axis non-linearly toward the object side so as to correct image plane variation due to magnification-varying when the magnification-varying from the wide-angle end to the telephoto end is performed. The variator V and the compensator C constitute a magnification-varying system. A stop (aperture stop) is denoted by SP. A fixed imaging lens unit R has a positive refractive power having an image formation action as the fourth lens unit. A color separation prism P is an optical filter or the like and is illustrated as a glass block in the figures. An image pickup surface I corresponds to an image pickup surface of a solid-state image pickup element (photoelectric transducer) for receiving light of an image formed by the zoom lens and performing photoelectric conversion.

In the aberration graphs, a straight line and a two-dot dashed line of the spherical aberration graph indicate aberrations on an e-line and a g-line, respectively. A dotted line and a straight line in the astigmatism graph indicate aberrations on a meridional image plane and a sagittal image plane, respectively, and a lateral chromatic aberration graph illustrates an aberration on the g-line. A half angle of field is denoted by ω, and an f-number is denoted by Fno. Note that, in the following embodiments, the wide-angle end and the telephoto end refer to zoom positions when the magnification-varying lens unit is positioned at both ends of a mechanically movable range on the optical axis.

The zoom lens of each embodiment includes, in order from the object side, a positive first lens unit that is fixed during magnification-varying, a negative second lens unit which moves for varying magnification, a positive third lens unit which moves for correcting image plane variation due to magnification-varying, and a positive fourth lens unit that is fixed during magnification-varying. In this zoom lens, the first lens unit includes a first sub lens unit 1a that is fixed during focus and a positive second sub lens unit 1b which moves for focusing, and the first sub lens unit 1a includes three lenses that are negative, positive, and positive lenses from the object side. The zoom lens satisfies the following condition:

$$0.5 < |(R12+R21)/(R12-R21)| < 40 \qquad (1)$$

where R12 denotes a curvature radius of an image-side surface of the negative lens of the first sub lens unit 1a, and R21 denotes a curvature radius of an object-side surface of the object-side positive lens of the first sub lens unit 1a.

The zoom lens of each embodiment has a feature that a lens configuration and a lens shape of the first sub lens unit 1a in the first lens unit are appropriately defined. Here, the conditional expression (1) defines an absolute value of a shape factor of an air lens formed between the negative lens and the object-side positive lens of the first sub lens unit 1a. In the zoom lens of each embodiment, it is important to appropriately set the shape factor of the air lens for achieving both a wide angle and a small size of the lens. By satisfying the conditional expression (1), it is possible to correct aberrations appropriately in the entire zoom region even when the principal point of the first lens unit is disposed in the image side of the first lens unit for achieving a wide angle. If the lower limit of the conditional expression (1) is not satisfied, the air lens has little power, and hence it is difficult to correct aberrations, in particular to correct spherical aberration variation on the telephoto side and off-axial aberration variation on the wide angle side. If the upper limit of the conditional expression (1) is not satisfied, power of the air lens is too large, and hence the principal point is disposed too farther in the image side of the first lens unit, and both the lens diameter and the entire length are apt to be large.

The following condition can be satisfied.

$$1.0 < |(R12+R21)/(R12-R21)| < 28 \quad (1a)$$

In addition, the conditional expression (1) can provide a larger effect when applied to a high-magnification zoom lens satisfying the following condition:

$$2.5 < ft/f1 < 4.7 \quad (2)$$

where f1 denotes a focal length of the first lens unit, and ft denotes a focal length of the zoom lens at the telephoto end. If the lower limit of the conditional expression (2) is not satisfied, power of the third lens unit becomes too large, and hence it becomes difficult to correct spherical aberration variation on the telephoto side and off-axial aberration variation on the wide angle side. If the upper limit of the conditional expression (2) is not satisfied, a zooming ratio of the first lens unit at the telephoto end becomes too large, and hence it becomes difficult to correct spherical aberration variation on the telephoto side and axial chromatic aberration.

The following condition can be satisfied.

$$2.9 < ft/f1 < 4.3 \quad (2a)$$

Through setting of the elements as described above, according to each embodiment, it is possible to obtain a small and lightweight zoom lens having a wide-angle end field angle of larger than 62 degrees and a zoom ratio of 90 or larger, in which aberrations can be corrected appropriately in the entire zoom range.

In each embodiment, it is advantageous for high magnification and is more preferred to set the elements so that, at the time of varying magnification, the second lens unit and the third lens unit simultaneously pass through the respective points at which an imaging magnification is −1.

In each embodiment, the following condition may be satisfied:

$$-0.2 < (R11+R12)/(R11-R12) < 1.0 \quad (3)$$

where R11 denotes a curvature radius of the object-side surface of the negative lens of the first sub lens unit 1a. The conditional expression (3) defines a shape factor of the negative lens of the first sub lens unit 1a. If the lower limit of the conditional expression (3) is not satisfied, a curvature radius of the negative lens on the object side becomes too small, and hence it becomes difficult to correct distortion variation on the wide angle side. If the upper limit of the conditional expression (3) is not satisfied, it becomes difficult to correct off-axial aberration variation on the wide angle side.

The following condition can be satisfied.

$$-0.1 < (R11+R12)/(R11-R12) < 0.9 \quad (3a)$$

The following condition can be satisfied:

$$-7.0 \times 10^{-2} < Ok1/f1 < -3.0 \times 10^{-2} \quad (4)$$

where Ok1 denotes a rear principal point position of the first lens unit. The conditional expression (4) defines a rear principal point of the first lens unit. If the lower limit of the conditional expression (4) is not satisfied, the rear principal point is not disposed in the image side of the first lens unit, and hence it is difficult to achieve a wide angle. If the upper limit of the conditional expression (4) is not satisfied, the rear principal point is disposed too farther in the image side of the first lens unit. As a result, a diameter of a focus moving lens unit in the first lens unit becomes large, and power of the fixed lens unit also becomes too large. Therefore, it becomes difficult to correct aberrations in the entire zoom region.

The following condition can be satisfied.

$$-6.96 \times 10^{-2} < Ok1/f1 < -4.0 \times 10^{-2} \quad (4a)$$

Further, the following condition can be satisfied:

$$6.0 \times 10^{-2} < L1w/f1 < 1.0 \times 10^{-1} \quad (5)$$

where L1w denotes a distance between principal points of the first lens unit and the second lens unit at the wide-angle end. The conditional expression (5) defines a distance between the rear principal point of the first lens unit and a front principal point of the second lens unit at the wide-angle end. If the lower limit of the conditional expression (5) is not satisfied, it is necessary to largely control the principal point of one of the first lens unit and the second lens unit, which is difficult to achieve together with aberration correction. If the upper limit of the conditional expression (5) is not satisfied, it becomes difficult to achieve both a wide angle and a small size.

The following condition can be satisfied.

$$7.0 \times 10^{-2} < L1w/f1 < 1.0 \times 10^{-1} \quad (5a)$$

The following condition can be satisfied:

$$1.5 < f1at/f1ai < 3.5 \quad (6)$$

where f1at denotes a combined focal length of the two positive lenses of the first sub lens unit 1a, and f1ai denotes a focal length of the image-side positive lens of the first sub lens unit 1a. The conditional expression (6) defines power of the positive lens in the first sub lens unit 1a. If the lower limit of the conditional expression (6) is not satisfied, power of the image-side positive lens becomes large, and hence it becomes difficult to correct a spherical aberration on the telephoto side, which causes an increase of manufacturing sensitivity, and thus is not preferred. If the upper limit of the conditional expression (6) is not satisfied, power of the image-side positive lens becomes small, and hence it becomes difficult to dispose the rear principal point of the first lens unit in the image side of the first lens unit.

The following condition can be satisfied.

$$1.6 < f1at/f1ai < 3.3 \quad (6a)$$

Further, at least one of the following conditions can be satisfied:

$$90 < \nu p < 100 \quad (7)$$

$$30 < \nu n < 40 \quad (8)$$

$$56 < \nu p - \nu n < 60 \quad (9)$$

where νp denotes an average Abbe constant of the positive lenses of the first lens unit, and νn denotes an average Abbe constant of negative lenses of the first lens unit. The conditional expressions (7) to (9) define Abbe constants of the positive lens and the negative lens of the first lens unit. When the conditional expressions (7) to (9) are satisfied, axial chromatic aberration on the telephoto side can be corrected appropriately.

At least one of the following conditions can be satisfied.

$$93 < \nu p < 98 \quad (7a)$$

$$35 < \nu n < 39 \quad (8a)$$

$$57 < \nu p - \nu n < 59 \quad (9a)$$

Next, features of the embodiments other than those described above are described.

Embodiment 1

First, a lens configuration of a first lens unit F in Embodiment 1 is described. The first lens unit F corresponds to a first lens surface to a twelfth lens surface in the numerical embodiment described later. The first lens unit F includes, in order from the object side to the image side, a negative lens and five positive lenses. A first sub lens unit 1a is a fixed lens unit, and a second sub lens unit 1b is a focus lens unit. An aspheric surface is each used for a thirteenth surface, a twenty-first surface, and a twenty-sixth surface. The thirteenth surface performs mainly distortion correction on the wide angle side, the twenty-first surface performs correction of off-axial aberration such as coma on the wide angle side, and the twenty-sixth surface performs correction of spherical aberration correction on the telephoto side.

Numerical Embodiment 1 satisfies all the conditional expressions (1) to (9). Embodiment 1 achieves a wide angle in which a photographing field angle (field angle) a photographing field angle (field angle) of 64.6 degrees at the wide-angle end is 67.7 degrees and a high magnification (zoom ratio) of 90. Further, in the entire zoom region, high optical performance is obtained in which various aberrations are appropriately corrected.

Embodiment 2

A lens configuration of a first lens unit F in Embodiment 2 is described below. The first lens unit F corresponds to a first lens surface to a twelfth lens surface in the numerical embodiment. The first lens unit F includes, in order from the object side to the image side, a negative lens and five positive lenses. A first sub lens unit 1a is a fixed lens unit, and a second sub lens unit 1b is a focus lens unit. An aspheric surface is each used for a thirteenth surface, a twenty-first surface, and a twenty-seventh surface. The thirteenth surface performs mainly distortion correction on the wide angle side, the twenty-first surface performs correction of off-axial aberration such as coma on the wide angle side, and the twenty-seventh surface performs spherical aberration correction on the telephoto side.

Numerical Embodiment 2 satisfies all the conditional expressions (1) to (9). Embodiment 2 achieves a wide angle in which a photographing field angle (field angle) a photographing field angle (field angle) of 64.6 degrees at the wide-angle end is 64.6 degrees and a high magnification (zoom ratio) of 120. Further, in the entire zoom region, high optical performance is obtained in which various aberrations are appropriately corrected.

Embodiment 3

A lens configuration of a first lens unit F in Embodiment 3 is described below. The first lens unit F corresponds to a first lens surface to a twelfth lens surface in the numerical embodiment. The first lens unit F includes, in order from the object side to the image side, a negative lens and five positive lenses. A first sub lens unit 1a is a fixed lens unit, and a second sub lens unit 1b is a focus lens unit. No aspheric surface is used, but a shape factor of an air lens formed by a second surface and a third surface is set appropriately. Therefore, off-axial aberration such as coma on the wide angle side and spherical aberration on the telephoto side are corrected appropriately.

Numerical Embodiment 3 satisfies all the conditional expressions (1) to (9). Embodiment 3 achieves a wide angle in which a photographing field angle (field angle) at the wide-angle end is 62.86 degrees and a high magnification (zoom ratio) of 90. Further, in the entire zoom region, high optical performance is obtained in which various aberrations are appropriately corrected.

Embodiment 4

Figure 7:
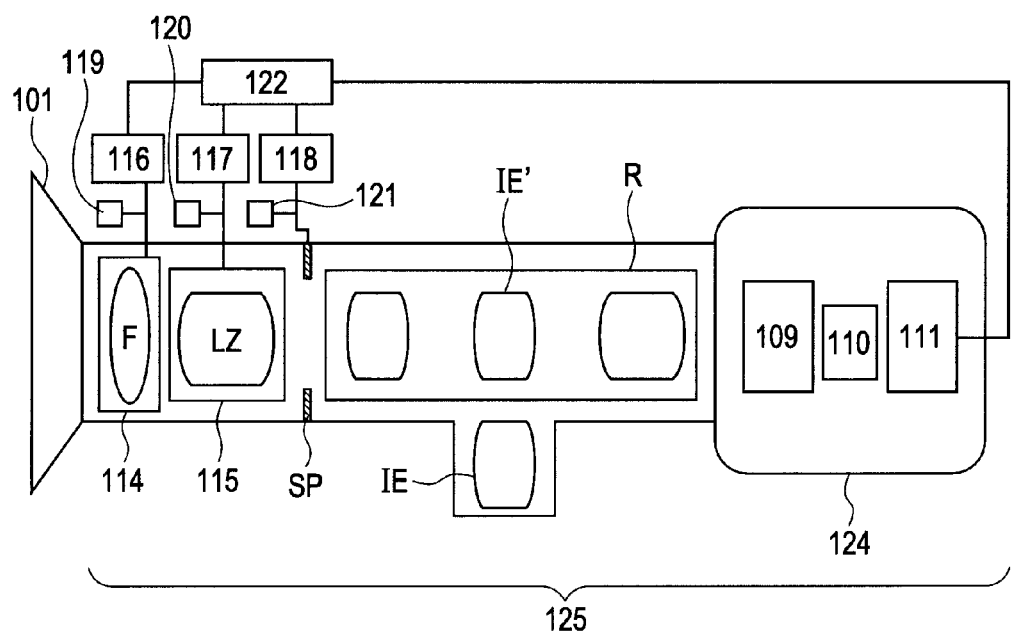
FIG. 7 is a schematic diagram of a main portion of an image pickup apparatus according to the present invention.

FIG. 7 is a schematic diagram of a main portion of an image pickup apparatus (TV camera system) employing the zoom lens of Embodiments 1 to 3 as an imaging optical system.

FIG. 7 illustrates a zoom lens 101 according to any one of Embodiments 1 to 3 and a camera 124. The zoom lens 101 can be mounted/removed on/from the camera 124. The zoom lens 101 is mounted on the camera 124 to form an image pickup apparatus 125. The zoom lens 101 includes a first lens unit F, a magnification-varying portion LZ, and a fourth lens unit R for image formation. The first lens unit F includes a focus lens unit. The magnification-varying portion LZ includes a second lens unit which moves on the optical axis for varying magnification, and a third lens unit which moves on the optical axis for correcting image plane variation due to magnification-varying. An aperture stop is denoted by SP. The fourth lens unit R includes lens units IE' and IE that can be inserted/removed into/from the optical path. Through exchange of the lens units IE' and IE, a focal length range of the entire system of the zoom lens 101 is changed. The zoom lens 101 also includes driving mechanisms 114 and 115, such as helicoids and cams, for driving in the optical axis direction the first lens unit F and the magnification-varying portion LZ. The image pickup apparatus 125 includes motors (driving means) 116 to 118 for electrically driving the driving mechanisms 114 and 115 and the aperture stop SP. The image pickup apparatus 125 also includes detectors 119 to 121, such as an encoder, a potentiometer, or a photo-sensor, which are configured to detect the positions of the first lens unit F and the magnification-varying portion LZ, and the aperture diameter of the aperture stop SP. In addition, the camera 124 includes a glass block 109, which corresponds to an optical filter or a color separation prism inside the camera 124. Further, the camera 124 includes a solid-state image pickup element (photoelectric transducer) 110, such as a charge-coupled device (CCD) sensor or a complementary metal-oxide semiconductor (CMOS) sensor. The solid-state image pickup element 110 is configured to receive a subject image formed by the zoom lens 101. Further, central processing units (CPUs) 111 and 122 control various types of driving of the camera 124 and the zoom lens 101, respectively. Through application of the zoom lens according to the present invention to a TV camera as described above, an image pickup apparatus having high optical performance is implemented.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

Hereinafter, Numerical Embodiments 1 to 3, corresponding to Embodiments 1 to 3 of the present invention, are described. In each of the numerical embodiments, "i" denotes an order of a surface from the object side, "ri" denotes a curvature radius of an i-th surface from the object side, "di" denotes an interval between the i-th surface and the (i+1)th surface from the object side, and "ndi" and "vdi" respectively denote a refractive index and an Abbe constant of the i-th optical member. Three surfaces closest to the image side are a glass block, such as a filter. Table 1 shows correspondences between each embodiment and the conditional expressions described above.

The aspherical shape is expressed in the following condition:

$$X = \frac{H^2/R}{1 + \sqrt{1-(1+k)(H/R)^2}} + A4H^4 + A6H^6 + A8H^8$$

where an X axis corresponds to the optical axis, an H axis corresponds to an axis perpendicular to the optical axis, a traveling direction of light corresponds to a positive direction, "R" denotes a paraxial curvature radius, denotes a conic constant, "A4", "A6", and "A8" each denote an aspherical coefficient, and "e-Z" means "$\times 10^{-Z}$".

Numerical Embodiment 1

Unit: mm

Surface data

| Surface Number | r | d | nd | vd | Effective diameter |
|---|---|---|---|---|---|
| 1 | −596.824 | 6.00 | 1.83400 | 37.2 | 213.50 |
| 2 | 650.444 | 10.68 | | | 207.27 |
| 3 | 6177.556 | 15.81 | 1.43387 | 95.1 | 207.08 |
| 4 | −470.417 | 0.25 | | | 206.90 |
| 5 | 987.962 | 21.13 | 1.43387 | 95.1 | 202.22 |
| 6 | −435.802 | 16.57 | | | 201.16 |
| 7 | 316.944 | 25.33 | 1.43387 | 95.1 | 198.86 |
| 8 | −784.095 | 0.25 | | | 198.33 |
| 9 | 233.492 | 16.59 | 1.43387 | 95.1 | 188.56 |
| 10 | 709.224 | 1.20 | | | 187.05 |
| 11 | 142.823 | 17.17 | 1.43875 | 94.9 | 171.94 |
| 12 | 260.349 | (Variable) | | | 169.66 |
| 13* | 453.585 | 2.20 | 2.00330 | 28.3 | 43.72 |
| 14 | 32.015 | 12.67 | | | 36.50 |
| 15 | −32.503 | 1.40 | 1.75500 | 52.3 | 35.79 |
| 16 | 148.424 | 8.44 | 1.95906 | 17.5 | 41.47 |
| 17 | −56.574 | 0.29 | | | 43.02 |
| 18 | −60.680 | 1.60 | 1.90366 | 31.3 | 43.21 |
| 19 | −119.627 | (Variable) | | | 45.05 |
| 20 | 119.283 | 12.13 | 1.59522 | 67.7 | 77.56 |
| 21* | −402.940 | 0.20 | | | 78.07 |
| 22 | 97.170 | 13.59 | 1.59522 | 67.7 | 79.47 |
| 23 | −351.177 | 0.20 | | | 78.76 |
| 24 | 75.365 | 2.30 | 1.80518 | 25.4 | 72.34 |
| 25 | 41.438 | 20.22 | 1.43875 | 94.9 | 65.31 |
| 26* | −6022.050 | (Variable) | | | 63.23 |
| 27 (Stop) | ∞ | 2.13 | | | 29.17 |
| 28 | −112.914 | 1.40 | 1.88300 | 40.8 | 28.48 |
| 29 | 27.001 | 6.75 | 1.80518 | 25.4 | 27.47 |
| 30 | −76.507 | 3.00 | | | 27.25 |
| 31 | −34.763 | 3.50 | 1.88300 | 40.8 | 26.35 |
| 32 | 160.449 | 8.86 | | | 27.13 |
| 33 | −75.716 | 2.50 | 1.83400 | 37.2 | 29.74 |
| 34 | −107.967 | 5.72 | 1.51823 | 58.9 | 30.86 |
| 35 | −28.865 | 14.35 | | | 31.72 |
| 36 | −76.195 | 3.66 | 1.51742 | 52.4 | 31.21 |
| 37 | −38.903 | 3.12 | | | 31.46 |
| 38 | −262.036 | 2.50 | 1.88300 | 40.8 | 29.76 |
| 39 | 40.083 | 6.06 | 1.53172 | 48.8 | 29.23 |
| 40 | −63.891 | 0.20 | | | 29.34 |
| 41 | 436.447 | 5.57 | 1.49700 | 81.5 | 29.01 |
| 42 | −29.789 | 2.50 | 1.88300 | 40.8 | 28.81 |
| 43 | −101.267 | 1.18 | | | 29.47 |
| 44 | 54.276 | 5.93 | 1.48749 | 70.2 | 29.40 |
| 45 | −58.327 | 10.00 | | | 29.00 |
| 46 | ∞ | 33.00 | 1.60859 | 46.4 | 60.00 |
| 47 | ∞ | 13.20 | 1.51633 | 64.2 | 60.00 |
| 48 | ∞ | 9.85 | | | 60.00 |
| Image plane | ∞ | | | | |

Aspherical surface data

Thirteenth surface

K = 5.50859e+001   A4 = 1.39713e−006   A6 = −4.03371e−010
A8 = −1.43726e−013

Twenty-first surface

K = 8.31666e+000   A4 = 1.33817e−007   A6 = 2.68279e−011
A8 = 3.43705e−015

Twenty-sixth surface

K = −6.64183e+004   A4 = 6.33192e−007   A6 = −2.04475e−012
A8 = −2.60891e−014

Various data
Zoom ratio 90.00

| | Wide angle | Intermediate | Telephoto |
|---|---|---|---|
| Focal length | 8.20 | 320.00 | 738.00 |
| F-number | 1.80 | 1.80 | 4.00 |
| Half angle of field | 33.85 | 0.98 | 0.43 |
| Image height | 5.50 | 5.50 | 5.50 |
| Total lens length | 599.24 | 599.24 | 599.24 |
| d12 | 2.65 | 147.67 | 154.81 |
| d19 | 242.40 | 39.30 | 3.51 |
| d26 | 3.00 | 61.08 | 89.72 |
| d48 | 9.85 | 9.85 | 9.85 |
| Entrance pupil position | 128.38 | 2847.27 | 8981.97 |
| Exit pupil position | 351.79 | 351.79 | 351.79 |
| Front principal point position | 136.78 | 3466.74 | 11312.80 |
| Rear principal point position | 1.65 | −310.15 | −728.15 |

Zoom lens unit data

| Unit | First surface | Focal length | Lens structure length | Front principal point position | Rear principal point position |
|---|---|---|---|---|---|
| 1 | 1 | 206.25 | 130.96 | 75.83 | −14.25 |
| 2 | 13 | −23.50 | 26.59 | 3.10 | −17.06 |
| 3 | 20 | 64.00 | 48.64 | 6.93 | −25.28 |
| 4 | 27 | 45.86 | 135.15 | 52.95 | 9.23 |

Single lens data

| Lens | First surface | Focal length |
|---|---|---|
| 1 | 1 | −370.01 |
| 2 | 3 | 1005.71 |
| 3 | 5 | 698.39 |
| 4 | 7 | 522.56 |
| 5 | 9 | 791.91 |
| 6 | 11 | 688.58 |
| 7 | 13 | −34.14 |
| 8 | 15 | −35.04 |
| 9 | 16 | 43.02 |
| 10 | 18 | −137.03 |
| 11 | 20 | 155.43 |
| 12 | 22 | 128.88 |
| 13 | 24 | −116.82 |
| 14 | 25 | 93.66 |
| 15 | 28 | −24.42 |
| 16 | 29 | 25.30 |
| 17 | 31 | −31.90 |
| 18 | 33 | −313.07 |
| 19 | 34 | 73.89 |
| 20 | 36 | 147.95 |
| 21 | 38 | −38.99 |
| 22 | 39 | 47.05 |
| 23 | 41 | 56.17 |
| 24 | 42 | −48.31 |
| 25 | 44 | 58.49 |
| 26 | 46 | 0.00 |
| 27 | 47 | 0.00 |

Numerical Embodiment 2

Unit: mm

Surface data

| Surface Number | r | d | nd | vd | Effective diameter |
|---|---|---|---|---|---|
| 1 | −963.426 | 6.00 | 1.83400 | 37.2 | 211.36 |
| 2 | 614.111 | 6.58 | | | 206.71 |
| 3 | 1035.332 | 15.81 | 1.43387 | 95.1 | 206.33 |
| 4 | −698.421 | 0.25 | | | 205.87 |
| 5 | 983.534 | 15.52 | 1.43387 | 95.1 | 201.24 |
| 6 | −741.068 | 26.27 | | | 200.13 |
| 7 | 358.589 | 19.56 | 1.43387 | 95.1 | 191.74 |
| 8 | −1310.234 | 0.25 | | | 191.29 |
| 9 | 291.337 | 14.52 | 1.43387 | 95.1 | 185.97 |
| 10 | 1163.861 | 1.20 | | | 184.80 |
| 11 | 197.140 | 13.39 | 1.43875 | 94.9 | 175.64 |
| 12 | 385.087 | (Variable) | | | 173.90 |
| 13* | 726.621 | 2.20 | 2.00330 | 28.3 | 46.34 |
| 14 | 40.686 | 9.28 | | | 40.29 |
| 15 | −75.312 | 1.40 | 1.88300 | 40.8 | 39.48 |
| 16 | 47.652 | 9.21 | 1.92286 | 18.9 | 39.12 |
| 17 | −80.805 | 2.43 | | | 38.96 |
| 18 | −47.132 | 1.60 | 1.81600 | 46.6 | 38.99 |
| 19 | −170.645 | (Variable) | | | 41.16 |
| 20 | 174.628 | 13.78 | 1.61800 | 63.3 | 83.89 |
| 21* | −152.037 | 0.20 | | | 84.67 |
| 22 | 107.082 | 15.29 | 1.59522 | 67.7 | 86.29 |
| 23 | −264.891 | 0.20 | | | 85.60 |
| 24 | 143.560 | 2.30 | 1.80518 | 25.4 | 79.67 |
| 25 | 54.214 | 18.57 | 1.43875 | 94.9 | 73.06 |
| 26 | ∞ | 2.64 | | | 71.56 |
| 27* | −2446.451 | 5.23 | 1.60311 | 60.6 | 70.31 |
| 28 | −251.277 | (Variable) | | | 69.43 |
| 29 (Stop) | ∞ | 2.34 | | | 31.66 |
| 30 | −105.663 | 1.40 | 1.88300 | 40.8 | 30.82 |
| 31 | 29.817 | 5.82 | 1.80518 | 25.4 | 29.53 |
| 32 | −531.514 | 3.94 | | | 29.26 |
| 33 | −82.076 | 1.85 | 1.81600 | 46.6 | 28.25 |
| 34 | 118.801 | 0.15 | | | 28.15 |
| 35 | 38.430 | 4.43 | 1.80809 | 22.8 | 28.45 |
| 36 | 203.623 | 2.54 | | | 27.86 |
| 37 | −89.475 | 1.58 | 1.88300 | 40.8 | 27.47 |
| 38 | 113.025 | 5.00 | | | 27.29 |
| 39 | −51.550 | 2.00 | 1.80100 | 35.0 | 27.57 |
| 40 | 171.377 | 6.41 | 1.51633 | 64.1 | 28.96 |
| 41 | −30.640 | 0.49 | | | 29.75 |
| 42 | −80.780 | 1.91 | 1.64769 | 33.8 | 29.94 |
| 43 | −1138.836 | 3.89 | 1.64000 | 60.1 | 30.54 |
| 44 | −61.233 | 2.25 | | | 30.92 |
| 45 | 370.794 | 10.15 | 1.64000 | 60.1 | 30.80 |
| 46 | 129.144 | 6.10 | | | 30.29 |
| 47 | −223.002 | 3.28 | 1.54072 | 47.2 | 30.64 |
| 48 | −66.097 | 3.12 | | | 30.83 |
| 49 | −622.604 | 3.07 | 1.83400 | 37.2 | 30.30 |
| 50 | 51.166 | 5.34 | 1.53172 | 48.8 | 30.09 |
| 51 | −76.406 | 0.20 | | | 30.21 |
| 52 | 3131.104 | 5.12 | 1.49700 | 81.5 | 30.04 |
| 53 | −33.362 | 2.50 | 1.88300 | 40.8 | 29.93 |
| 54 | −72.482 | 1.18 | | | 30.60 |
| 55 | 70.640 | 8.23 | 1.51823 | 58.9 | 30.16 |
| 56 | −70.250 | 10.00 | | | 29.58 |
| 57 | ∞ | 33.00 | 1.60859 | 46.4 | 60.00 |
| 58 | ∞ | 13.20 | 1.51633 | 64.2 | 60.00 |
| 59 | ∞ | 10.31 | | | 60.00 |
| Image plane | ∞ | | | | |

Aspherical surface data

Thirteenth surface

K = −1.62882e+003   A4 = 1.27340e−006   A6 = −7.94225e−010
A8 = 5.25483e−013

Twenty-first surface

K = −1.21122e+001   A4 = 1.87376e−008   A6 = 6.36712e−011
A8 = −6.52874e−015

Twenty-seventh surface

K = 3.67187e+003   A4 = 2.10552e−007   A6 = −1.16472e−010
A8 = 3.54033e−014

Various data
Zoom ratio 120.00

| | Wide angle | Intermediate | Telephoto |
|---|---|---|---|
| Focal length | 8.70 | 300.00 | 1044.00 |
| F-number | 1.80 | 1.80 | 5.70 |
| Half angle of field | 32.30 | 1.05 | 0.30 |
| Image height | 5.50 | 5.50 | 5.50 |
| Total lens length | 665.61 | 665.61 | 665.61 |
| d12 | 2.65 | 191.71 | 205.85 |
| d19 | 295.63 | 56.75 | 1.94 |
| d28 | 2.82 | 52.65 | 93.32 |
| d59 | 10.31 | 10.31 | 10.31 |
| Entrance pupil position | 128.10 | 2714.86 | 13813.33 |
| Exit pupil position | 197.86 | 197.86 | 197.86 |
| Front principal point position | 137.21 | 3494.75 | 20668.99 |
| Rear principal point position | 1.61 | −289.69 | −1033.69 |

Zoom lens unit data

| Unit | First surface | Focal length | Lens structure length | Front principal point position | Rear principal point position |
|---|---|---|---|---|---|
| 1 | 1 | 261.57 | 119.35 | 74.70 | −12.61 |
| 2 | 13 | −26.00 | 26.13 | 4.74 | −13.19 |
| 3 | 20 | 66.00 | 58.21 | 11.37 | −29.38 |
| 4 | 29 | 42.57 | 150.50 | 55.78 | 18.14 |

Single lens data

| Lens | First surface | Focal length |
|---|---|---|
| 1 | 1 | −446.07 |
| 2 | 3 | 961.53 |
| 3 | 5 | 974.31 |
| 4 | 7 | 649.58 |
| 5 | 9 | 888.97 |
| 6 | 11 | 898.75 |
| 7 | 13 | −42.67 |
| 8 | 15 | −32.69 |
| 9 | 16 | 33.23 |
| 10 | 18 | −79.86 |
| 11 | 20 | 133.17 |
| 12 | 22 | 129.66 |
| 13 | 24 | −108.45 |
| 14 | 25 | 123.26 |
| 15 | 27 | 462.09 |
| 16 | 30 | −26.06 |
| 17 | 31 | 34.90 |
| 18 | 33 | −58.94 |
| 19 | 35 | 57.33 |
| 20 | 37 | −56.02 |
| 21 | 39 | −48.95 |
| 22 | 40 | 50.70 |
| 23 | 42 | −133.40 |
| 24 | 43 | 100.57 |
| 25 | 45 | −313.55 |
| 26 | 47 | 171.60 |
| 27 | 49 | −56.21 |
| 28 | 50 | 58.20 |
| 29 | 52 | 66.26 |
| 30 | 53 | −71.76 |
| 31 | 55 | 69.07 |
| 32 | 57 | 0.00 |
| 33 | 58 | 0.00 |

Numerical Embodiment 3

Unit: mm

Surface data

| Surface Number | r | d | nd | vd | Effective diameter |
|---|---|---|---|---|---|
| 1 | −5000.000 | 6.00 | 1.83400 | 37.2 | 209.92 |
| 2 | 404.564 | 7.60 | | | 203.75 |
| 3 | 443.152 | 21.77 | 1.43387 | 95.1 | 202.93 |
| 4 | −795.645 | 0.25 | | | 202.10 |
| 5 | 6677.972 | 12.02 | 1.43387 | 95.1 | 198.70 |
| 6 | −654.694 | 25.50 | | | 197.47 |
| 7 | 285.918 | 20.83 | 1.43387 | 95.1 | 185.44 |
| 8 | −1807.516 | 0.25 | | | 184.81 |
| 9 | 391.554 | 10.80 | 1.43387 | 95.1 | 180.25 |
| 10 | 1499.379 | 1.20 | | | 179.10 |
| 11 | 168.213 | 12.79 | 1.43875 | 94.9 | 168.42 |
| 12 | 285.500 | (Variable) | | | 166.60 |
| 13 | 848.227 | 2.00 | 1.88300 | 40.8 | 47.43 |
| 14 | 49.564 | 8.54 | | | 41.85 |
| 15 | −79.401 | 1.90 | 1.81600 | 46.6 | 40.80 |
| 16 | 207.660 | 4.02 | | | 39.88 |
| 17 | −95.031 | 1.90 | 1.83481 | 42.7 | 39.74 |
| 18 | 73.746 | 6.68 | 1.95906 | 17.5 | 41.99 |
| 19 | −240.930 | (Variable) | | | 43.07 |
| 20 | 9235.763 | 10.02 | 1.72916 | 54.7 | 71.76 |
| 21 | −99.034 | 4.57 | | | 72.83 |
| 22 | −69.340 | 2.70 | 1.83400 | 37.2 | 72.88 |
| 23 | −84.989 | 0.20 | | | 75.27 |
| 24 | 113.102 | 14.65 | 1.49700 | 81.5 | 78.98 |
| 25 | −199.463 | 0.30 | | | 78.63 |
| 26 | 84.467 | 2.50 | 1.80518 | 25.4 | 74.06 |
| 27 | 46.932 | 14.85 | 1.49700 | 81.5 | 68.55 |
| 28 | 236.391 | 0.20 | | | 67.68 |
| 29 | 219.192 | 5.08 | 1.60311 | 60.6 | 67.53 |
| 30 | ∞ | (Variable) | | | 66.63 |
| 31 (Stop) | ∞ | 3.36 | | | 32.87 |
| 32 | −100.212 | 1.80 | 1.81600 | 46.6 | 31.60 |
| 33 | 37.328 | 4.97 | 1.80809 | 22.8 | 30.54 |
| 34 | 231.528 | 10.91 | | | 30.18 |
| 35 | −31.662 | 1.59 | 1.81600 | 46.6 | 28.82 |
| 36 | 107.990 | 13.53 | 1.54814 | 45.8 | 30.96 |
| 37 | −30.229 | 27.37 | | | 34.26 |
| 38 | −142.791 | 12.23 | 1.48749 | 70.2 | 34.29 |
| 39 | −47.998 | 0.54 | | | 35.08 |
| 40 | −168.310 | 3.99 | 1.83400 | 37.2 | 34.26 |
| 41 | 49.847 | 10.62 | 1.48749 | 70.2 | 33.85 |
| 42 | −57.971 | 4.04 | | | 34.38 |
| 43 | 262.203 | 6.50 | 1.51742 | 52.4 | 33.31 |
| 44 | −38.295 | 2.51 | 1.88300 | 40.8 | 32.99 |
| 45 | −162.563 | 0.20 | | | 33.39 |
| 46 | 59.847 | 5.54 | 1.51742 | 52.4 | 33.78 |
| 47 | −91.069 | 15.00 | | | 33.61 |
| 48 | ∞ | 33.00 | 1.60859 | 46.4 | 60.00 |
| 49 | ∞ | 13.20 | 1.51633 | 64.2 | 60.00 |
| 50 | ∞ | 13.67 | | | 60.00 |
| Image plane | ∞ | | | | |

Various data
Zoom ratio 90.00

| | Wide angle | Intermediate | Telephoto |
|---|---|---|---|
| Focal length | 9.00 | 320.00 | 810.00 |
| F-number | 1.85 | 1.85 | 4.50 |
| Half angle of field | 31.43 | 0.98 | 0.39 |
| Image height | 5.50 | 5.50 | 5.50 |
| Total lens length | 668.37 | 668.37 | 668.37 |
| d12 | 2.87 | 184.70 | 195.56 |
| d19 | 279.80 | 43.90 | 1.97 |
| d30 | 2.03 | 56.10 | 87.17 |
| d50 | 13.67 | 13.67 | 13.67 |
| Entrance pupil position | 132.61 | 2726.27 | 8694.18 |
| Exit pupil position | 150.37 | 150.37 | 150.37 |
| Front principal point position | 142.20 | 3795.37 | 14303.87 |
| Rear principal point position | 4.67 | −306.33 | −796.33 |

Zoom lens unit data

| Unit | First surface | Focal length | Lens structure length | Front principal point position | Rear principal point position |
|---|---|---|---|---|---|
| 1 | 1 | 257.56 | 119.01 | 72.87 | −15.06 |
| 2 | 13 | −27.50 | 25.04 | 5.08 | −13.65 |
| 3 | 20 | 66.50 | 55.06 | 14.38 | −23.28 |
| 4 | 31 | 41.60 | 170.89 | 60.43 | 16.92 |

Single lens data

| Lens | First surface | Focal length |
|---|---|---|
| 1 | 1 | −445.71 |
| 2 | 3 | 657.87 |
| 3 | 5 | 1371.47 |
| 4 | 7 | 569.28 |
| 5 | 9 | 1214.79 |
| 6 | 11 | 900.88 |
| 7 | 13 | −59.34 |
| 8 | 15 | −69.82 |
| 9 | 17 | −49.21 |
| 10 | 18 | 58.71 |
| 11 | 20 | 133.86 |
| 12 | 22 | −487.01 |
| 13 | 24 | 147.09 |
| 14 | 26 | −133.96 |
| 15 | 27 | 114.49 |
| 16 | 29 | 362.01 |
| 17 | 32 | −32.97 |
| 18 | 33 | 53.89 |
| 19 | 35 | −29.70 |
| 20 | 36 | 44.41 |
| 21 | 38 | 141.80 |
| 22 | 40 | −45.44 |
| 23 | 41 | 56.62 |
| 24 | 43 | 64.77 |
| 25 | 44 | −56.95 |
| 26 | 46 | 70.37 |
| 27 | 48 | 0.00 |
| 28 | 49 | 0.00 |

TABLE 1

Values of conditional expressions corresponding to Numerical Embodiments 1 to 3

| Conditional expression | Embodiment 1 | Embodiment 2 | Embodiment 3 |
|---|---|---|---|
| (1) $|(R12 + R21)/(R12 − R21)|$ | 1.24 | 3.92 | 21.97 |
| (2) $ft/f1$ | 3.58 | 3.99 | 3.14 |
| (3) $(R11 + R12)/(R11 − R21)$ | −0.04 | 0.22 | 0.85 |
| (4) $Ok1/f1$ | $-6.91 \times 10^{-2}$ | $-4.82 \times 10^{-2}$ | $-5.85 \times 10^{-2}$ |
| (5) $Llw/f1$ | $9.70 \times 10^{-2}$ | $7.65 \times 10^{-2}$ | $8.93 \times 10^{-2}$ |
| (6) $f1at/f1ai$ | 1.68 | 2.00 | 3.06 |
| (7) $vp$ | 95.06 | 95.06 | 95.06 |
| (8) $vn$ | 37.16 | 37.16 | 37.16 |
| (9) $vp − vn$ | 57.90 | 57.90 | 57.90 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-089686, filed Apr. 14, 2011, which is hereby incorporated by reference herein in its entirety.

What is claimed is:

1. A zoom lens, comprising, in order from an object side:
   a first lens unit having a positive refractive power which does not move for varying magnification;
   a second lens unit having a negative refractive power which moves for varying magnification;
   a third lens unit having a positive refractive power which moves for varying magnification; and
   a fourth lens unit having a positive refractive power which does not move for varying magnification, wherein:
   the first lens unit includes a first sub lens unit which does not move for focusing and a second sub lens unit having a positive refractive power which moves for focusing;
   the first sub lens unit includes three lenses having negative, positive, and positive refractive powers in order from the object side; and
   the following conditions are satisfied:

$0.5 < |(R12+R21)/(R12-R21)| < 40;$ and $2.5 < ft/f1 < 4.7,$ where R12 denotes a curvature radius of an image-side surface of a negative lens of the first sub lens unit, R21 denotes a curvature radius of an object-side surface of an object-side positive lens of the first sub lens unit, f1 denotes a focal length of the first lens unit, and ft denotes a focal length of the zoom lens at a telephoto end thereof.

2. A zoom lens according to claim 1, wherein, when the magnification is varied from a wide-angle end to the telephoto end, the second lens unit and the third lens unit simultaneously pass through respective points at which an imaging magnification is −1.

3. A zoom lens according to claim 1, wherein the following condition is satisfied:

$-0.2 < (R11+R12)/(R11-R12) < 1.0,$ where R11 denotes a curvature radius of an object-side surface of the negative lens of the first sub lens unit.

4. A zoom lens according to claim 1, wherein the following conditions are satisfied:

$-7.0 \times 10^{-2} < Ok1/f1 < -3.0 \times 10^{-2};$ and $6.0 \times 10^{-2} < L1w/f1 < 1.0 \times 10^{-1},$ where Ok1 denotes a rear principal point position of the first lens unit, and L1w denotes a distance between principal points of the first lens unit and the second lens unit at the wide-angle end.

5. A zoom lens according to claim 1, wherein the following condition is satisfied:

$1.5 < flat/f1ai < 3.5,$ where flat denotes a combined focal length of the two positive lenses of the first sub lens unit, and f1ai denotes a focal length of an image-side positive lens of the first sub lens unit.

6. A zoom lens according to claim 1, wherein at least one of the following conditions is satisfied:

$90 < vp < 100;$ $30 < vn < 40;$ and $56 < vp-vn < 60,$ where vp denotes an average Abbe constant of the positive lenses of the first lens unit, and vn denotes an average Abbe constant of the negative lenses of the first lens unit.

7. An image pickup apparatus, comprising:
   a zoom lens including, in order from an object side:
      a first lens unit having a positive refractive power which does not move for varying magnification;
      a second lens unit having a negative refractive power which moves for varying magnification;
      a third lens unit having a positive refractive power which moves for varying magnification; and
      a fourth lens unit having a positive refractive power which does not move for varying magnification, wherein:
      the first lens unit includes a first sub lens unit which does not move for focusing and a second sub lens unit having a positive refractive power which moves for focusing;
      the first sub lens unit includes three lenses having negative, positive, and positive refractive powers in order from the object side; and
      the following conditions are satisfied:

$0.5 < |(R12+R21)/(R12-R21)| < 40;$ and $2.5 < ft/f1 < 4.7,$ where R12 denotes a curvature radius of an image-side surface of a negative lens of the first sub lens unit, R21 denotes a curvature radius of an object-side surface of an object-side positive lens of the first sub lens unit, f1 denotes a focal length of the first lens unit, and ft denotes a focal length of the zoom lens at a telephoto end thereof; and
   a solid-state image pickup element for receiving light of an image formed by the zoom lens.

\* \* \* \* \*